United States Patent [19]
Gastle et al.

[11] Patent Number: 5,871,361
[45] Date of Patent: Feb. 16, 1999

[54] EDUCATIONAL KIT

[76] Inventors: William J. Gastle, RR#2, Hillsburgh, Ontario, Canada, N0B 1Z0; Joachim Sparkuhl, 76 Glengarry Avenue, Toronto, Ontario, Canada, M5M 1C9; Kevin Cassidy, 233 Annette St., Toronto, Ontario, Canada, M6P 1P9

[21] Appl. No.: 440,394

[22] Filed: May 12, 1995

[51] Int. Cl.$^6$ .................................................. G09B 23/24
[52] U.S. Cl. .......................... 434/295; 434/298; 434/276
[58] Field of Search .................................... 434/276, 295, 434/298

[56] References Cited

U.S. PATENT DOCUMENTS 1,430,849  10/1922  Porter ................................... 434/298 X
5,055,259  10/1991  Inoue et al. ........................... 434/276 X

FOREIGN PATENT DOCUMENTS 2752631  6/1978  Germany ................................ 434/298
2917703  11/1980  Germany ................................ 434/298

Primary Examiner—Jeffrey A. Smith
Attorney, Agent, or Firm—Thomas A. O'Rourke

[57] ABSTRACT

A kit for students to carry out biotechnology experiments in a classroom, comprising a plurality of first containers, each of the first containers containing a sample of a prepared substance for use in the experiments; at least one of the prepared substances including a biologically derived constituent; each of the prepared substances having constituents selected for their safety in a classroom experiment, while being representative of a substance used in an industrial experiment. A plurality of second containers are also provided, the second containers being arranged to receive a number of test samples of substances to be tested. A number of aids are also provided to allow the students to carry out the experiments in the absence of instrumentation used in the industrial experiment, along with a set of instructions to permit the students to carry out the classroom experiment and thereby to better understand the industrial experiment.

8 Claims, 6 Drawing Sheets

| Name: _____ | Class: _____ | Date: _____ |

GROUP RESULTS

Non-smoker Urine Control:  Color Intensity _____ ⟵ A1

Cut-Off Urine Control:  Color Intensity _____ ⟵ A2

Smoker Urine Control:  Color Intensity _____ ⟵ A3

Is the Cut-Off lighter than Non-smoker Control ?  [] yes  [] no
Is Smoker Controls light or lighter than Cut-Off ?  [] yes  [] no
If you answered yes to both questions the controls worked properly. If you answered no to either question, your test did not work and you should consult your instructor.

Donor Urine #1:  Color Intensity _____ ⟵ A4

Does this person use tobacco ?  [] yes  [] no  [] don't know
Is the dipstick as light or lighter
than the Cut-Off Control  [] yes (means positive for continue)
 [] no (means negative for continue)

Conclusion: _____

Donor Urine #2:  Color Intensity _____ ⟵ A5

Does this person use tobacco ?  [] yes  [] no  [] don't know
Is the dipstick as light or lighter
than the Cut-Off Control  [] yes (means positive for continue)
 [] no (means negative for continue)

Conclusion: _____

CLASS CALCULATION: In this section you will tabulate the results for the whole class Using the following table record the total number of students tested who do not use tobacco and were negative in the test (A) or positive in the test (B). Then record total number of students tested who do use tobacco and were negative in the test (C) or positive in the test (D). Calculate test secificity and sensitivity as shown below.

|  | Continue BioBlox Test Result | | When a company is developing or improving a test, they test sample groups and do calculations like this as part of their research. If your class would like to be one of our sample groups, please send us a record of your results by mail or fax. We will add your information to our data base. |
| --- | --- | --- | --- |
| Donor Group | Negative for continue | Positive for continue | |
| Does not use Tobacco | A: | B: | |
| Uses Tobacco | C: | D: | |

(A/A + B)* 100 = % Specificity = _____  (D/C + D)* 100 = % Sensitivity = _____

FIG. 5a

Name: _____ Class: _____ Date: _____

GROUP RESULTS:

Chemical Tested: _____

NUMBER OF COLONIES:

Negative Control Chemical: _____

Positive Control Chemical: _____

Test Chemical: _____

DISTRIBUTION OF COLONIES:

48

EDUCATIONAL KIT

CROSS-REFERENCE TO SUBMITTED APPENDICES

An educator manual for a cotinine test and an educator manual for an Ames test are, respectively, being filed as Appendices to the present application. A portion of the disclosure of this patent document contains material which is subject to copyright protection. The copyright owner has no objection to the facsimile reproduction by any one of the patent disclosure, as it appears in the Patent and Trademark Office patent files or records, but otherwise reserves all copyright rights whatsoever.

BACKGROUND OF THE INVENTION

1. Field of the Invention

The present invention relates to educational kits and more particularly to educational kits concerning biotechnology.

2. Description of the Related Art

Biotechnology has provided monumental gains in the development of industrial and pharmaceutical compounds, to make biotechnology a high growth industry. As this industry grows, so does its dependence on the education system to prepare young teenage students for work in the field. However, the pace of change in biotechnology has in recent years exceeded the ability of the education system to update its curricula accordingly. Moreover, there is a lack of practical experimental tools available to teachers to provide young teenage students hands-on experience in biotechnology.

It is an object of the present invention to provide a novel educational kit that mitigates these problems.

SUMMARY OF THE INVENTION

Briefly stated, the invention involves a kit for students to carry out biotechnology experiments in a classroom, comprising:

a plurality of first containers, each of the first containers containing a sample of a prepared substance for use in the experiments; at least one of the prepared substances including a biologically derived constituent; each of the prepared substances having constituents selected for their safety in a classroom experiment, while being representative of a substance used in an industrial experiment;

a plurality of second containers, the second containers being arranged to receive a number of test samples of substances to be tested; and a number of aids to allow the students to carry out the experiments in the absence of instrumentation used in the industrial experiment; and a set of instructions to permit the students to carry out the classroom experiment and thereby to better understand the industrial experiment.

In another aspect of the present invention, there is provided a dipstick for a cotinine assay, the dipstick bearing a monoclonal antibody specific to cotinine.

In still another aspect of the present invention, there is provided a method of forming a dipstick for a cotinine assay, comprising the steps of:

preparing a solution containing an antibody specific to cotinine and a buffer;

attaching a nitrocellulose substrate layer to a support layer;

depositing said substrate layer in said solution; and selecting conditions for the solution to optimize the hydrophobic binding of said antibody to said substrate layer.

BRIEF DESCRIPTION OF THE DRAWINGS

Several preferred embodiments of the present invention will now be described by way of example only, with reference to the appended drawings in which:

FIG. 5a is a view of another portion of the kit illustrated in FIG. 1.

DESCRIPTION OF THE PREFERRED EMBODIMENTS

Figure 1:
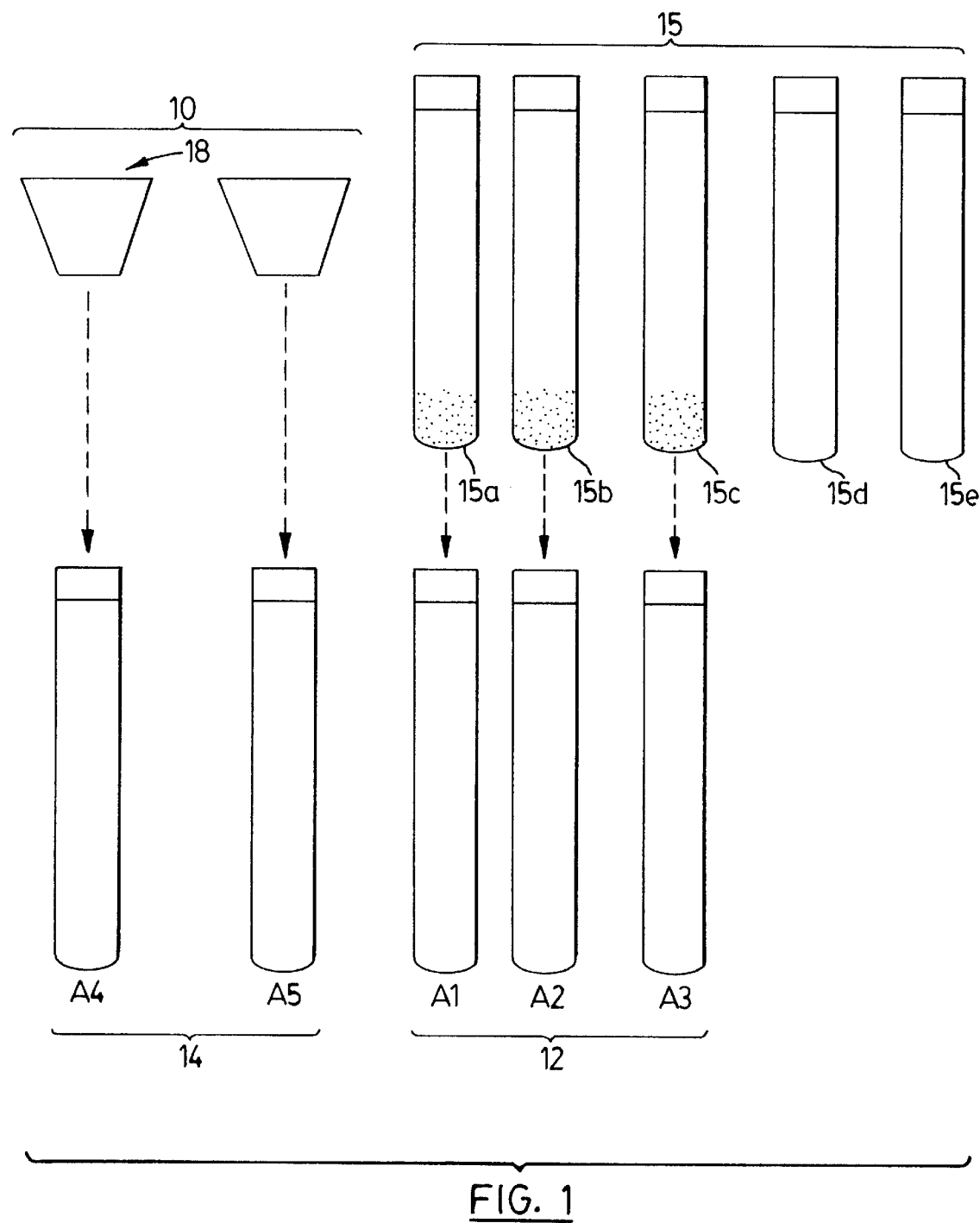
FIG. 1 is a view of a portion of an educational kit.
Figure 2:
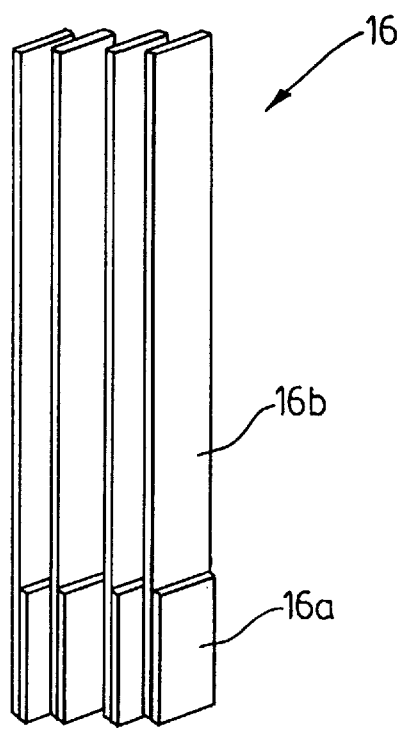
FIG. 2 is a perspective view of another portion of the kit illustrated in FIG. 1.

Referring to the figures, there is provided a kit 10 for young teenage students to carry out biotechnology experiments in a classroom. By young teenage students is meant those students attending grades 9 to 12 and more particularly to grades 11 and 12 or to students aged 15 to 18 years old.

The kit 10 comprises a plurality of first containers 12, for example in the form of tubes labelled A1 to A3, each of which contains a sample of a prepared substance for use in the experiments. The kit 10 also includes a plurality of second containers 14, in the form of tubes A4 and A5, to receive a number of test samples of substances to be tested.

Each of the prepared substances has constituents selected for their safety in a classroom experiment, while being representative of a substance used in an industrial experiment. There are a number of industrial experiments that may be adapted for relatively unskilled students in a classroom environment by selecting safe constituents as alternatives to those that are used by highly trained professionals in industry. In addition, the adaptation of these industrial experiments may include configuring the constituents to be stable at room temperature to accommodate the absence of conventional industrial storage equipment and conditions in a classroom environment. Some examples follow:

1) A bioassay using a bacterial culture such as *Salmonella* may be adapted for a classroom by using a nonvirulent strain of *Salmonella typhimurium* (such as strain TA1538), for example that available from the American Type Culture Collection under number ATCC 29631.

2) A cotinine assay making use of a freeze dried control urine sample, from which dilute urine samples can be prepared.

The kit also includes a number of aids, for example the dipsticks shown at 16 for use during the experiments, to allow the students to carry out the experiments in the absence of instrumentation normally available in the industrial experiment, but not generally available in the classroom. The dipsticks 16 each have a nitrocellulose substrate layer 16a bearing an antibody which is specific to the cotinine, thereby to test the first, second and third samples. The dipsticks are formed by a plastic base portion 16b with the nitrocellulose substrate layer 16a positioned thereon. The nitrocellulose substrate layer is available commercially under the tradename IMOBILON made by MILLIPORE CORPORATION and has a strong hydrophobic affinity to protein. An antibody specific to cotinine is bound by a hydrophobic affinity to the nitrocellulose substrate layer.

The dipstick is formed in the following manner. A solution is prepared containing an antibody specific to cotinine and a buffer. The antibody is prepared from a monoclonal cell line derived from a mouse having been injected with a cotinine-carrying protein, by a technique based on that published by Kohler and Milstein, 1975, Nature, Vol. 256 pp 495–97. To summarize the technique, the cotinine monoclonal antibody is produced by first attaching the cotinine to a selected protein in such a way to present the small ringed chemical cotinine to the immune system of the animal, in this case mice. This is done by injecting the protein into mice, and identifying the SPLENOCYTE which produces an antibody specific to the cotinine. This cell was then cloned and replicated in a conventional manner to mass produce the monoclonal cotinine antibody.

The buffer is selected to optimize the conditions at which the antibody in solution has a hydrophobic affinity to the nitrocellulose. For example, a buffer such as carbonate may be used to maintain the pH of the solution at about 9.5 to provide those optimum conditions. With the solution prepared, the nitrocellulose substrate layer is attached to a support layer to form a dipstick. The so-formed dipstick is then placed in the solution to bind the monoclonal antibody with the nitrocellulose substrate layer.

Thereafter, the nitrocellulose substrate layer is placed in a solution containing a blocking protein, such as bovine serum albumen, to bind the blocking protein to remaining unbound sites on the nitrocellulose substrate layer. The nitrocellulose substrate layer is then placed in the solution.

The kit also includes a set of instructions to permit a student to carry out the experiments and a guide to help the student appreciate the relevance of the industrial experiment to society. The kit may also provide the set of instructions and the guide in other formats such as a video cassette or CD ROM diskette.

The kit comprises substances which themselves may include substituents originating from an animal, such as human urine. Alternatively, the kit may comprise substances including substituents originating from other sources, such as plants, air samples or the like.

For example, in order for students to gain an appreciation of the effects of smoking or other drug abuse, the kit may be used to analyze body fluids such as urine. In the case of human urine, the kit may comprise a first sample including urine containing continue at a level representative of the urine of a subject known to be a heavy tobacco user, namely 5 micrograms per mil, and a second sample including urine from a subject known not to be a user of tobacco and containing no measurable amount of cotinine.

The kit may also have a third sample including urine containing continine at a level between that of the first and second samples, such as 0.5 micrograms per mil or one-tenth the concentration from that expected from the urine of a heavy smoker. This sample may be used as a cut-off sample as shall be described below. To maintain the stability of the samples, they are freeze-dried and located in containers 15a, 15b and 15c.

In order for the samples to be consistent, the first and third samples may be prepared by adding commercially available cotinine to a sample of urine such as the second sample.

While the kit makes use of cotinine as a nicotine-indicating substance, there are other metabolites of nicotine present in the urine of tobacco users. However, these others are usually in much smaller quantities and have a significantly shorter half life.

In the case of cotinine, a tube 15d is provided which contains a sample of cotinine bearing a label compound. This sample may be prepared in the following manner. First, a commercial grade cotinine such as that available from SIGMA CHEMICAL COMPANY is matched with one of several enzymes such as a purified form of alkaline phosphatase available from the SCRIPPS INSTITUTE. This enzyme was selected because of its catalytic activity to provide a distinct colour change. The enzyme-cotinine is produced by a hydroxysuccinimide conjugation through the 4 position of the pyrrolidine ring of the cotinine to provide a stable bond between the enzyme and the cotinine.

The enzyme-cotinine is matched by finding the enzyme that will provide the most stable bond with the cotinine.

Still another tube 15e contains a reactive sample including substituents known to be converted by the label compound to form another compound, in the form of a precipitate, having a colour different from that of both the label reactive substituent and the label compound, thereby to enable the student to visibly detect the presence of the other compound. For example the reactive sample may be that known as BCIP/NBT PHOSPHATASE SUBSTRATE SYSTEM available from KIRKEGAARD AND PERRY LABORATORIES INC., including 5-bromo-4-chloro-3-indolyhl-phosphate and Nitroblue Tetrazolium.

It will be understood that the reagents used in the kit may be stored in packages for laboratory use such as vials, ampoules, capped test tubes and the like, depending of course on their consistency. In addition, some of the reagents may be light- and moisture-sensitive requiring the use of filtered storage materials such as amber coloured glass and plastic and the use of desiccants. For example, the dipsticks should be packaged with desiccants to guard against moisture-caused breakdown of the antibody.

The kit also includes a student worksheet 17 shown in FIG. 5a to enable the student to record observations from the experiment, as will be described.

The kit 10 may be used in the following manner. First, instructor prepares the three control urine samples prior to the class. This is done by rehydrating the urine samples in containers 15a, 15b and 15c and distributing a portion of each to each student group in the corresponding three control tubes A1, A2 and A3. Each of the control urine samples has a known quantity of cotinine in each, namely i) control tube A1, a urine sample containing continine at relatively high level as typically found in the urine of a heavy smoker;

ii) control tube A2, a urine sample from a subject known not to smoke and containing no measurable amount of cotinine; and iii) control tube A3, a urine sample with a quantity of cotinine between i) and ii). This sample contains what is known as the cut-off control sample which has a minimum quantity of cotinine to be considered a positive sample.

In addition to the control urine samples in control tubes A1, A2 and A3, the teacher also adds a solution containing a prepared buffer commonly known as 'TRIS BUFFER' and a preservative known as THIMEROSOL and available from SIGMA CHEMICAL COMPANY, which together preserve the sample and control the pH level of the urine to a particular level. The teacher then adds the same preservative and buffer to tubes A4 and A5. Alternatively, the kit may be assembled with the preservative and buffer already in the tubes A1 to A5.

The students then collect two donor urine samples using the sample cups provided at 18. Given its relative instability, the urine may be collected in advance, preferably on the day of the experiment. These donor urine samples will be tested for the presence of cotinine, thereby to determine whether the urine comes from a smoker or a non-smoker.

The students then remove the caps from two tubes, identified as donor tubes A4 and A5, and transfer four drops of donor urine from each sample cup to the corresponding donor tube. The students then remove the caps from the three remaining tubes, namely control tubes A1, A2 and A3.

Five dipsticks 16 are selected and each is deposited into the corresponding tubes A1 to A5 as shown by FIG. 3 and are left there to incubate for the required time, for example about 25 minutes, to bind the antibody on the dipstick with the cotinine present in the sample. After 25 minutes, the five dipsticks are removed from the tubes A1 to A5 and may be placed on a dry surface such as a paper towel.

Figures 3A, 3B, 3C:
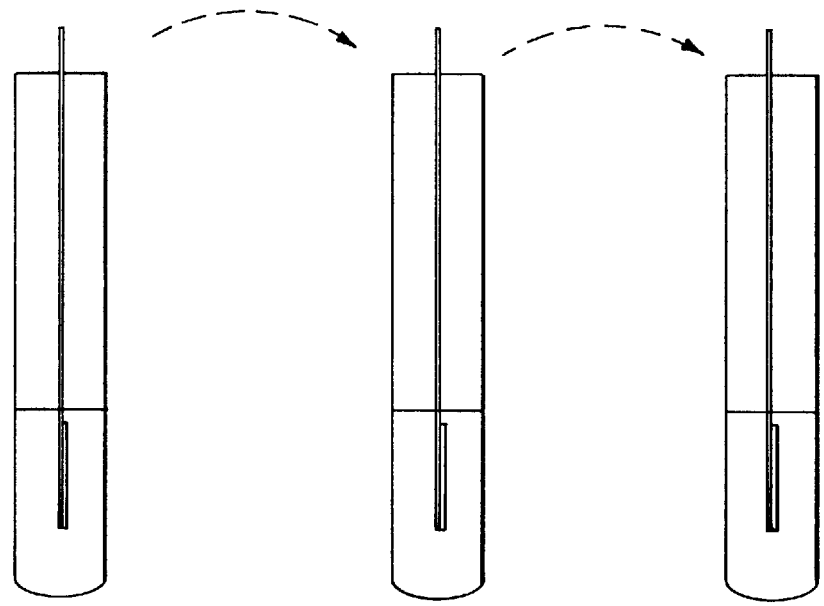
FIGS. 3a, 3b and 3c are schematic operative views of a portion of the kit illustrated in FIG. 1.

Four drops of the labelled Cotinine from tube 15d are then deposited into each of the tubes and gently mixed. The dipsticks 16 are transferred into their corresponding tubes as is shown at FIG. 3b and are left there to incubate for the required time, for example 20 minutes.

After 20 minutes, the tubes A1 to A5 are washed in a solution of TRIS BUFFER and non-ionic detergent such as that under the tradename TWEEN-20 and a portion of the reactive sample is deposited into each tube A1 to A5. The five dipsticks are again returned to their corresponding five tubes as shown in FIG. 3c to be exposed to the reactive substituent, which will react with the enzyme-labelled cotinine to form a precipitate, in this case having a purple colour. The extent of the colour change is dependent on the concentration of labelled-cotinine sites on the nitrocellulose substrate layer, the greater the quantity of labelled-cotinine, the greater the colour change will appear to the student's eye.

The dipsticks are then washed in a prepared wash solution of TRIS BUFFER (which also may include non-ionic detergent of the type described above) and are dried.

Figure 4:
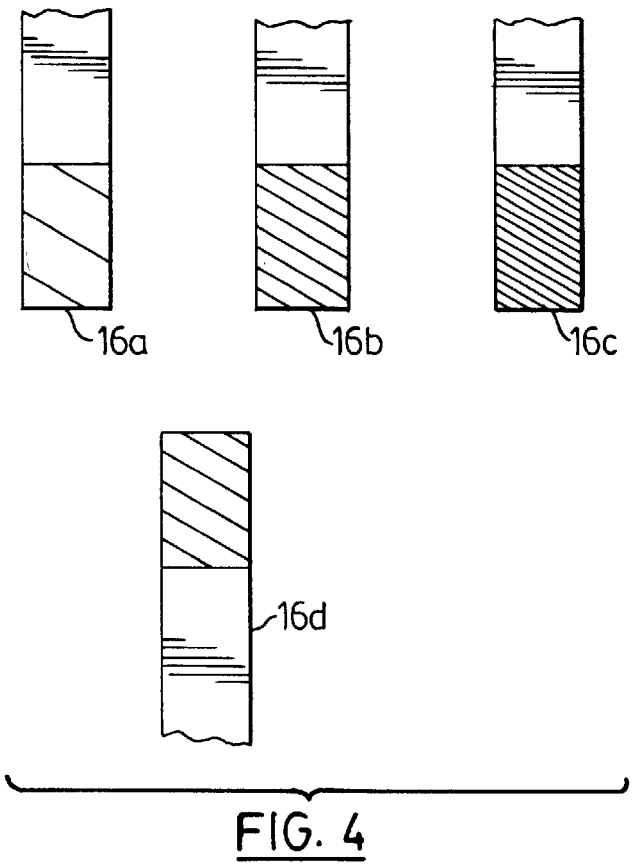
FIG. 4 is another operative view of a portion of the kit illustrated in FIG. 1.

The students thus have two dipsticks from the donor urine samples A4 and A5 and the three dipsticks from the control samples A1, A2 and A3. The students may now compare the colour change of the two test samples with the control samples as shown in FIG. 4. In this case, the smoker control sample 16a will have contained a relatively high concentration of cotinine, leaving few remaining antibody binding sites for the labelled cotinine. As a result, the smoker control sample has little if any colour change. On the other hand, the non-smoker control sample 16b will have a strong colour change, since most of the binding sites on the dipstick will be bound to the labelled cotinine. It follows that the cut-off control sample 16c will have a mid-range colour change. In the case of FIG. 4, one test sample 16d is shown with a positive result.

The students may then record their findings using the worksheet 17 as shown in FIG. 5a. As can be seen in phantom, the worksheet provides locations for the students to attach the two dipsticks from the donor urine samples A4 and A5 and the three dipsticks from the control samples A1, A2 and A3.

Figure 5:
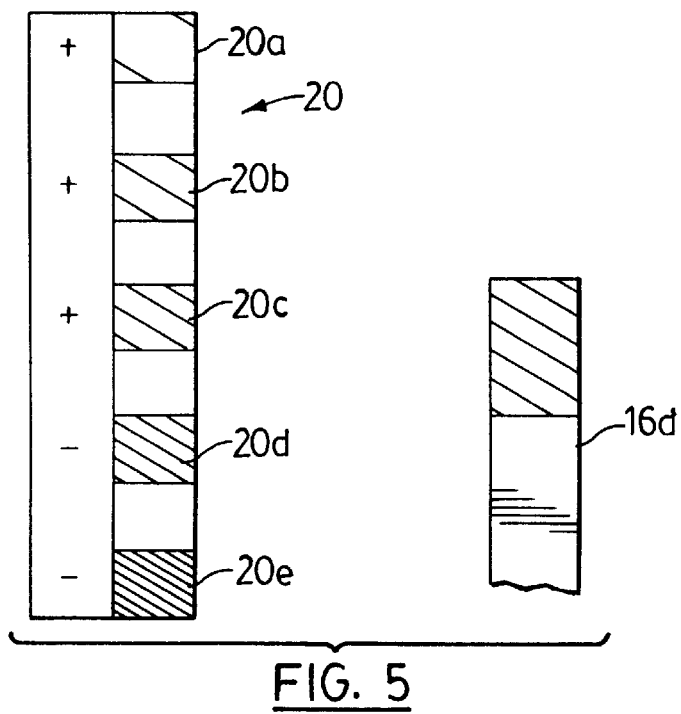
FIG. 5 is another operative view of an alternative portion of the kit illustrated in FIG. 1.

As shown in FIG. 5, instead of forming the three control samples, the students may be provided with a colour reference card 20, which has a number of coloured areas 20a to 20e which provide a range of colours along with indicia indicating to students the range of colours corresponding to a positive test.

Thus, the dipsticks allow the students to ascertain a colour change in a test sample with a simple comparison with the colour changes in a number of control samples or with a colour reference card. This is done in the absence of the relatively sophisticated microwells used in industrial spectrophotometry typically unavailable in the classroom in question.

While the kit has been described with reference to the analysis of cotinine in human urine, it will be understood that kit may similarly be used to analyze a wide variety of other drugs and drug metabolites in urine, such as THC from marijuana and benzoylegonine, a metabolite of cocaine.

Figure 6:
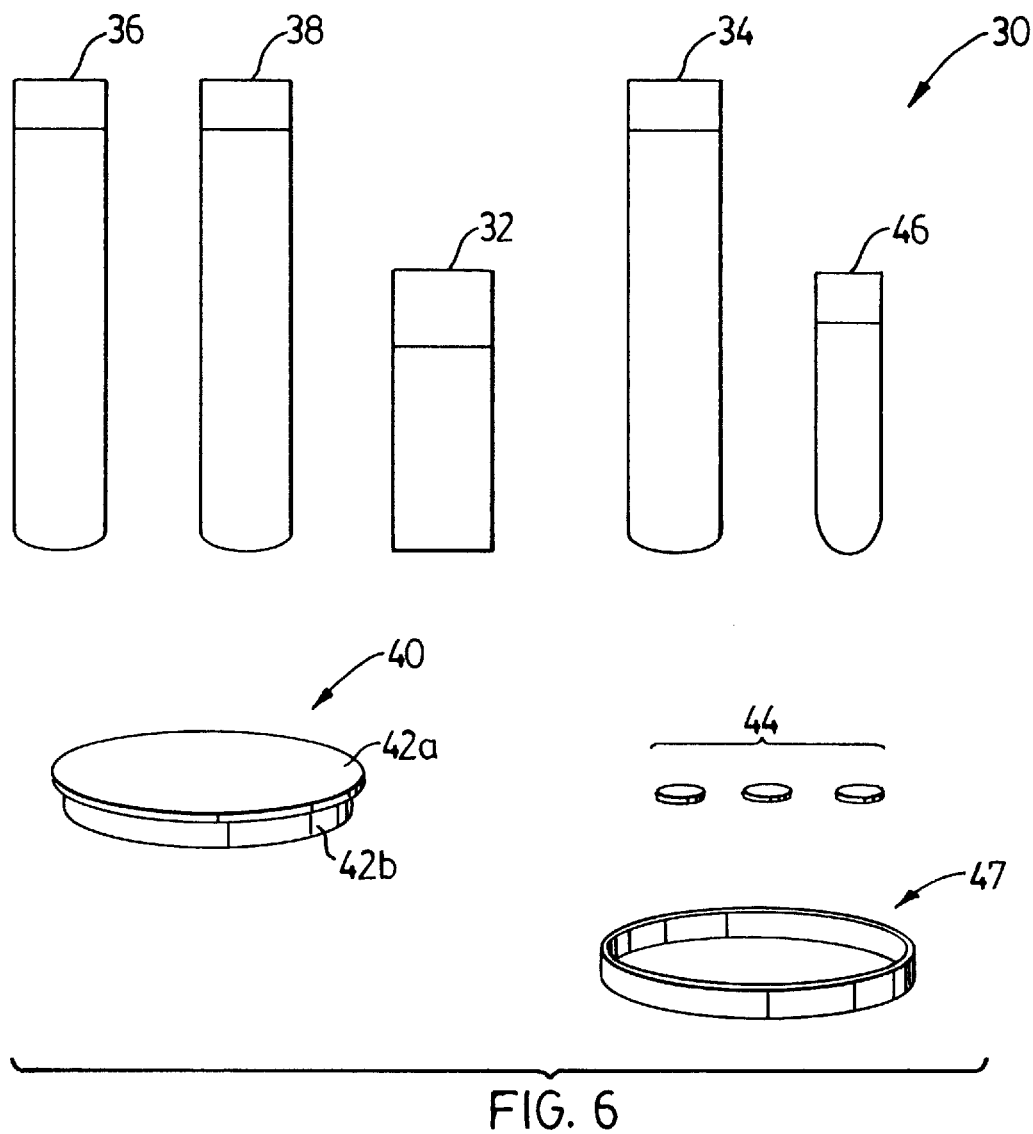
FIG. 6 is a view of a portion of another educational kit.

Referring to the figures, another kit is shown at 30 in FIG. 6. In this case, the kit 30 is a bioassay kit, which provides the student with the necessary ingredients to carry out an experiment using a bacterial culture. The experiment is a simplified version of a procedure developed by Dr. Bruce Ames at the University of California in 1972.

For example, for students to gain an appreciation for the potentially harmful effects of industrial chemicals, the kit may include a bacterial culture and a number of chemicals which cause a abnormally high growth rates in the culture, indicating for example the mutagenic nature of the chemical.

The kit 30 includes a first container 32 carrying a bacterial culture which is a nonvirulent strain of *Salmonella typhimurium*. For convenience in handling, the culture is freeze-dried. This nonvirulent strain of *Salmonella typhimurium* (such as strain TA1538), is available from the American Type Culture Collection under number ATCC 29631. A second container 34 carries a growth medium for the culture, such as Trypticase Soy Broth, available from DIFCO. A third container 36 carries a positive control chemical, such as Acridine di-hydrochloride, which is available from SIGMA CHEMICAL COMPANY. A fourth container 38 carries a negative control chemical, such as purified water.

Figure 8:
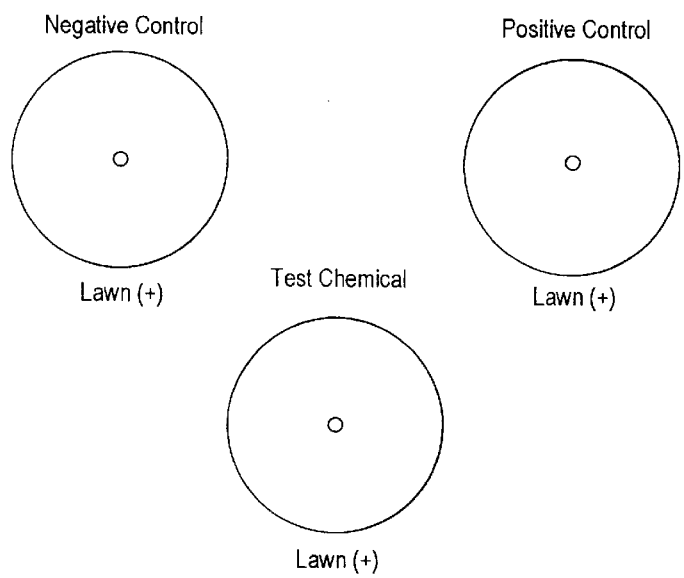
FIG. 8 is a view of another portion of the kit illustrated in FIG. 6.

A number of test containers 40 are also provided for use by the students to prepare a test sample, a positive control sample and a negative control sample. Also provided is an agar plate 40 having a lid 42a and a body 42b and a number of filter discs 44 are provided to carry out the experiment. A number of containers are also provided at 46 carrying a soft agar overlay supplemented with histidine and biotin, and a number of containers 47 in the form of plastic plates are provided for preparing samples. Finally, a student worksheet 48 shown in FIG. 8 enables the student to record observations from the experiment, as will be described.

To prepare for the experiment, the student instructor rehydrates the bacterial culture in order to seed cultures. This is done by removing the caps from the first container 32 containing the bacteria and the second container 34 containing the trypticase soy broth. The trypticase soy broth is then added to the first container 32, the contacts are stirred and the corresponding cap replaced on the container. The first container 32 is then allowed to stand at room temperature overnight, to produce rapidly growing cultures of indicator bacteria. On the day of the class, the bacteria are re-suspended by gently inverting the first container. Before the class, the containers 46 containing the soft agar are placed in a water bath at a temperature of 45 degrees Celsius to melt the soft agar. The instructor also prepares two plates 47, one containing the positive control chemical and the other containing the negative control chemical.

To begin the experiment, the students remove the containers 46 from the water bath. Five drops of indicator bacteria are then added to each of three containers 46 and are thereafter mixed. The mixture from one container 46 is then poured on the solid agar in the body 42b of plate 40 which is then closed with its lid 42a. The plate is then tilted back and forth to gently swirl the soft agar and distribute it evenly over the surface of the solid agar base in the body 42b. This is repeated for the mixtures of the other two containers 46 to form three prepared plates. The so-prepared plates are then left to stand at room temperature until the soft agar has once again hardened. The three plates are then labelled 'N' (for negative control), 'P' (for positive control) and 'T' (for test chemical).

Figure 7:
FIG. 7 is an operative view of a portion of the kit illustrated in FIG. 6.

Using forceps, the students then dip a filter disk into the Negative Control chemical in the corresponding plate 47 and place the dipped disk into the center of the plate marked 'N', in the manner shown in FIG. 7. The instructor places a filter disk in the plate 47 containing the Positive Control chemical in the center of the plate marked 'P'.

The students then label another plate 47 'Test' and prepare a liquified test sample therein, either by using a liquid test material or a solid test material mixed with the Negative Control chemical to make a slurry or paste. Test materials might include for example, gasoline, engine oil, cigarette ash and the like. Using forceps, the students dip a filter disk into the test sample and places it at the centre of the plate marked 'T'. The prepared plates are then incubated at room temperature for four to five days.

The students then use the worksheets 48 to record their findings. This is done by counting the number of colonies that appear on each plate. The students are instructed that each bacterial colony is the result of the division of a single mutated bacterium, which began the process to form histidine to allow additional bacteria to grow. The students use the work sheet to record the growth patterns on each of the plates. The incubation time is selected to permit the colonies to grow sufficiently large for the students to see by the naked eye. Along with the distribution of colonies, the worksheet also cues the student to record the presence or absence of a bacterial lawn.

In addition to the above, each kit may also provided with a number of safety items such as gloves, safety goggles, bags, pipets and the like, along with a sheet of instructions permitting a student to carry out the experiment along the lines set out above. However, the kit may be provided with a minimum of materials, thus relying on the availability of test tubes and the like in the classroom.

We claim:

1. A kit for students to carry out biotechnology experiments in a classroom, comprising:
    a plurality of first containers, each of said first containers containing a sample of a prepared substance for use in said experiments; at least one of said prepared substances including a biologically derived constituent; each of said prepared substances having constituents selected for their safety in a classroom experiment, while being representative of a substance used in an industrial experiment;
    a plurality of second containers, said second containers being arranged to receive a number of test samples of substances to be tested; and
    a number of aids to allow said students to carry out said experiments in the absence of instrumentation used in said industrial experiment; and
    a set of instructions to permit said students to carry out said classroom experiment and thereby to better understand said industrial experiment, said prepared substances including a nonvirulent strain of *Salmonella typhimurium*.

2. A kit for students to carry out biotechnology experiments in a classroom, comprising:
    a plurality of first containers, each of said first containers containing a sample of a prepared substance for use in said experiments; at least one of said prepared substances including a biologically derived constituent; each of said prepared substances having constituents selected for their safety in a classroom experiment, while being representative of a substance used in an industrial experiment;
    a plurality of second containers, said second containers being arranged to receive a number of test samples of substances to be tested; and
    a number of aids to allow said students to carry out said experiments in the absence of instrumentation used in said industrial experiment; and
    a set of instructions to permit said students to carry out said classroom experiment and thereby to better understand said industrial experiment, said prepared substances include substituents originating from human urine.

3. A kit for students to carry out biotechnology experiments in a classroom, comprising:
    a plurality of first containers, each of said first containers containing a sample of a prepared substance for use in said experiments; at least one of said prepared substances including a biologically derived constituent; each of said prepared substances having constituents selected for their safety in a classroom experiment, while being representative of a substance used in an industrial experiment;
    a plurality of second containers, said second containers being arranged to receive a number of test samples of substances to be tested; and
    a number of aids to allow said students to carry out said experiments in the absence of instrumentation used in said industrial experiment; and
    a set of instructions to permit said students to carry out said classroom experiment and thereby to better understand said industrial experiment, said prepared substances include substituents originating from human urine, said samples further comprising a first sample including urine containing cotinine at a level representative of the urine of a subject known to be a heavy tobacco user and a second sample including urine with substantially no cotinine and from a subject known not to use tobacco.

4. A kit as defined in claim 3 wherein said samples further comprise a third sample including cotinine at a level between said first and second samples.

5. A kit as defined in claim 4 wherein said samples further comprise a sample of cotinine bearing a label compound.

6. A kit as defined in claim 5 wherein said label compound is alkaline phosphatase.

7. A kit as defined in claim 6 further comprising a sample including a substituent reactive with said label compound to form another compound, said other compound having a colour different from that of both said label reactive substituent and said label compound thereby to enable the student to visibly detect the presence of said other compound.

8. A kit as defined in claim 7 wherein said aids include a plurality of dipsticks, each of said dipsticks including a substrate layer bearing an antibody specific to cotinine.

* * * * *